(12) United States Patent
Suzuki et al.

(10) Patent No.: US 9,588,522 B2
(45) Date of Patent: Mar. 7, 2017

(54) MOTOR CONTROLLER AND MOTOR CONTROL METHOD

(71) Applicants: Haruyuki Suzuki, Kanagawa (JP); Takuya Murata, Tokyo (JP)

(72) Inventors: Haruyuki Suzuki, Kanagawa (JP); Takuya Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 42 days.

(21) Appl. No.: 14/657,853

(22) Filed: Mar. 13, 2015

(65) Prior Publication Data

US 2015/0185736 A1 Jul. 2, 2015

Related U.S. Application Data

(63) Continuation of application No. 13/788,289, filed on Mar. 7, 2013, now Pat. No. 9,018,885.

(30) Foreign Application Priority Data

Mar. 12, 2012 (JP) .................................. 2012-055153
Dec. 18, 2012 (JP) .................................. 2012-275888

(51) Int. Cl.
*H02P 21/00* (2016.01)
*G05B 21/02* (2006.01)
(Continued)

(52) U.S. Cl.
CPC ............. *G05D 3/203* (2013.01); *G05B 15/02* (2013.01); *G05B 21/02* (2013.01)

(58) Field of Classification Search
CPC ................................. H02P 21/00; G05B 21/02
(Continued)

(56) References Cited

U.S. PATENT DOCUMENTS 4,376,262 A * 3/1983 Okuda ..................... H02P 8/42
318/400.25
4,443,742 A * 4/1984 Schneider ............ G03B 27/525
318/60

(Continued)

FOREIGN PATENT DOCUMENTS

JP 9-65686 A 3/1997
JP 2003-23785 A 1/2003
(Continued)

OTHER PUBLICATIONS

Office Action issued on Sep. 6, 2016 in Japanese Patent Application No. 2012-275888.

*Primary Examiner* — Bentsu Ro
(74) *Attorney, Agent, or Firm* — Oblon, McClelland, Maier & Neustadt, L.L.P.

(57) ABSTRACT

A motor controller receiving as input an encoder signal changing in response to a driving position of a motor, outputting a motor driving command in response to the encoder signal to control at least one of the driving position or a driving velocity of the motor, includes an interrupt processing section to execute interrupt operations every prescribed interrupt cycle, a low-frequency processing section to selectively execute a subset of the interrupt operations every prescribed number of the interrupt cycles, and a high-frequency processing section to execute another subset of the interrupt operations every prescribed interrupt cycle, wherein the high-frequency processing section executes at least an operation to detect the driving position indicated by the encoder signal, wherein the low-frequency processing section executes at least an operation to generate the motor driving command.

9 Claims, 13 Drawing Sheets

(51) Int. Cl.
*G05D 3/20* (2006.01)
*G05B 15/02* (2006.01)

(58) Field of Classification Search
USPC ....... 318/569, 594, 600, 602, 606, 626, 633, 318/634, 636
See application file for complete search history.

(56) References Cited

U.S. PATENT DOCUMENTS

| | | | | |
|---|---|---|---|---|
| 4,470,108 | A | * | 9/1984 | Kato ..................... G05B 19/23 318/603 |
| 5,587,633 | A | * | 12/1996 | Aoki ....................... B30B 15/14 318/162 |
| 6,121,747 | A | | 9/2000 | Trachtenberg |
| 6,300,884 | B1 | | 10/2001 | Wilson |
| 7,906,925 | B2 | * | 3/2011 | Takeuchi .................. H02P 5/00 310/68 B |
| 2001/0030999 | A1 | | 10/2001 | Moizio et al. |
| 2005/0174076 | A1 | | 8/2005 | Katanaya |
| 2011/0074320 | A1 | | 3/2011 | Nakamura et al. |
| 2012/0068643 | A1 | | 3/2012 | Sukuki |
| 2012/0306419 | A1 | | 12/2012 | Sukuki |

FOREIGN PATENT DOCUMENTS

| | | |
|---|---|---|
| JP | 2004-088926 | 3/2004 |
| JP | 2006-338367 | 12/2006 |
| JP | 2011-044006 | 3/2011 |
| JP | 2011-078251 | 4/2011 |

* cited by examiner

FIG.10

| PROCESS | 0 | 1 | 2 | 3 | 4 | 5 | 6 | 7 | 8 | 9 | 10 | 11 |
|---|---|---|---|---|---|---|---|---|---|---|---|---|
| GENERATE TARGET POSITION | * | | | | * | | | | | | | |
| GENERATE TARGET VELOCITY | | * | | | | * | | | * | | | |
| DETECT CURRENT POSITION | * | * | * | * | * | * | * | * | * | * | * | * |
| DETECT CURRENT VELOCITY | * | * | * | * | * | * | * | * | * | * | * | * |
| COMPARE POSITIONS | | | * | | | | * | | | * | | |
| COMPARE VELOCITIES | * | * | * | * | * | * | * | * | * | * | * | * |
| LPF | * | * | * | * | * | * | * | * | * | * | * | * |
| VELOCITY CONTROL | | | | * | | | | * | | | | * |
| | 0 | 1 | 2 | 3 | 0 | 1 | 2 | 3 | 0 | 1 | 2 | 3 |
| | (SCNT MOD 4) | | | | | | | | | | | |

SCNT

MOTOR CONTROLLER AND MOTOR CONTROL METHOD

BACKGROUND OF THE INVENTION

1. Field of the Invention

The disclosures herein generally relate to a technology to control velocity and position of a motor.

2. Description of the Related Art

Motors are widely used for moving objects such as sheets for sheet conveyance control in a printer, heads for head-positioning control in a disc storage device, etc. To control the position and the velocity of an object that is to be moved by the motor, a position sensor and/or a velocity sensor may be attached to the motor shaft or the object to be moved. A signal from the sensor is used for comparing the target position and/or velocity with the sensed current position and/or velocity, to feedback-control a motor drive quantity of the object.

To execute such feedback control, digital control is widely used where a microcomputer, which is equipped with a CPU (Central Processing Unit), a memory and input/output ports and the like, sample sensor signals periodically and output computed motor drive quantity. To execute the digital control, it is common to use an interrupt mechanism generally provided with a microcomputer, which makes an interrupt request to a CPU in a prescribed sampling cycle to carry out control processing with an interrupt routine.

Japanese Laid-open Patent Application No. 2006-338367 (referred to as Patent document 1 hereinafter) discloses a technology used in an electronic device that controls a motor drive quantity with a timer interrupt, which prevents precision of control from being deteriorated if an execution of the interrupt routine is delayed. Namely, in Patent document 1, if an execution of a timer interrupt signal, which is generated at a prescribed interval to execute a motor driving operation, is delayed by another execution caused by another interrupt signal, the delay time between the interrupt signal generation and the interrupt routine execution is computed to correct position information for feedback control.

Japanese Laid-open Patent Application No. 2011-44006 (referred to as Patent document 2 hereinafter) discloses a technology to obtain a present position without using a high performance counter or an ASIC (Application Specific Integrated Circuit) chip as the counter. Namely, in Patent document 2, a moving body controller is disclosed, which includes a two-phase counter detecting each of two-phase pulse signals output from an encoder, and performing count processing, and a one-phase counter detecting only A-phase pulse signal of the signals, and performing count processing. The moving body controller calculates a position error that is a difference between a target position and a present position acquired by the counters, outputs a target velocity corresponding to the position error from an amplification device, decides whether the position error is comparatively small or large by an error decision device, and determines the present position by the two-phase counter if the position error is comparatively small, or by the one-phase counter if the position error is comparatively large.

Patent document 1 above deals with a problem in that precision of control deteriorates when another interrupt routine has priority over the interrupt routine for motor controlling, resulting in a delayed execution of a motor controlling operation. However, even using the technology in Patent document 1, it is inevitable that precision deteriorates to a certain degree. Moreover, a delay between the sampling and the output of the motor drive quantity causes a phase delay of the control quantity, which reduces phase margin and destabilizes control according to the feedback control theory. In the worst case, oscillation or other unstable states may be induced.

Patent document 2 also discloses a technology for feedback control of position and velocity using a microcomputer. In this case, it does not accept other interrupts, which causes no delay for motor control processing.

However, both conventional technologies may have a possibility that an interrupt process does not end within a prescribed cycle, if the number of operations to be executed during the interrupt process increases. If that is the case, normal operations cannot be completed, resulting in a state of collapse.

The possibility that an interrupt process does not end may rise if the cycle for an interrupt process is shortened to try to get better control performance, or a software counter is used instead of an expensive hardware counter to lower cost. Simply shortening the cycle or using a software counter may be problematic.

SUMMARY OF THE INVENTION

At least one embodiment of the present invention provides a motor controller and a motor control method that substantially obviate one or more problems caused by the limitations and disadvantages of the related art. Specifically, a motor controller controls the position and the velocity of a motor by regularly processing interrupts with high precision and without causing a delay of the processing or collapse of control, even if the processing includes a number of operations to be executed with an inexpensive CPU or a microcomputer.

According to at least one embodiment of the present invention, a motor controller receiving as input an encoder signal changing in response to a driving position of a motor, outputting a motor driving command in response to the encoder signal to control at least one of the driving position or a driving velocity of the motor, includes an interrupt processing section to execute interrupt operations every prescribed interrupt cycle, the interrupt processing section including a low-frequency processing section and a high-frequency processing section, the low-frequency processing section to selectively execute a subset of the interrupt operations not needed to be executed every prescribed interrupt cycle but to be executed once in every prescribed number of the interrupt cycles, and the high-frequency processing section to execute another subset of the interrupt operations every prescribed interrupt cycle, wherein the high-frequency processing section executes at least an operation to detect the driving position of the motor indicated by the encoder signal, wherein the low-frequency processing section executes at least an operation to generate the motor driving command in response to the driving position of the motor detected with the high-frequency processing section.

According to at least one embodiment of the present invention, it is possible to provide a motor controller that controls the position and the velocity of a motor by regularly processing interrupts with high precision and without causing a delay of the processing or collapse of control, even if the processing includes a number of operations to be executed with an inexpensive CPU or a microcomputer.

BRIEF DESCRIPTION OF THE DRAWINGS

Further features of embodiments will be apparent from the following detailed description when read in conjunction with the accompanying drawings:

FIG. 10 is a schematic view illustrating an execution schedule of interrupt operations according to the third embodiment;

DESCRIPTION OF THE PREFERRED EMBODIMENTS

In the following, embodiments of the present invention will be described with reference to the accompanying drawings.

<First Embodiment>

Figure 1:
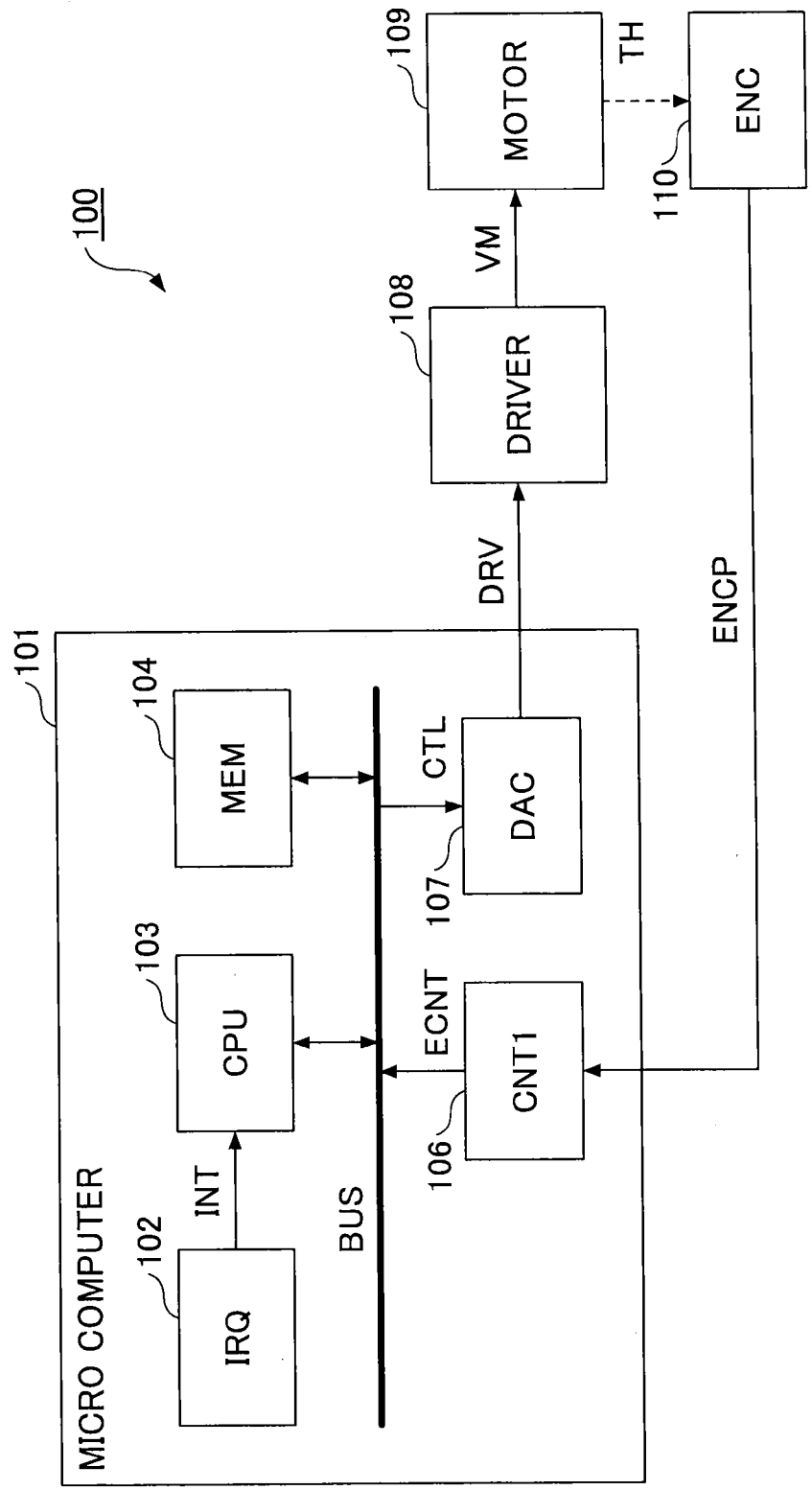
FIG. 1 is a schematic view illustrating a hardware configuration example of a motor controller according to the first embodiment.

FIG. 1 is a schematic view illustrating a hardware configuration example of a motor controller 100 according to the first embodiment.

In FIG. 1, a microcomputer 101 is a general microcomputer equipped with a CPU 103, a memory 104 and input/output devices inside, which can execute prescribed tasks. A drive command signal DRV is output from the microcomputer 101 to a motor driver 108 connected to a motor 109.

The motor driver 108 outputs a drive voltage VM to the motor 109 in response to the drive command signal DRV output from the microcomputer 101. The drive command signal DRV may be indicated with a voltage or a pulse signal proportional to the voltage modulated with pulse width modulation (PWM), which are design alternatives. Similarly, the drive voltage VM may be indicated with a voltage or a PWM pulse.

The motor 109 generates a driving force in response to the drive voltage VM for rotary motion if the motor 109 is a rotary motor, or for linear motion if the motor 109 is a linear motor.

An encoder (ENC) 110 outputs an encoder signal ENCP changing its value in response to an angle of rotation or a position in linear motion of the motor 109. Specifically, for example, if the motor 109 is a rotary motor, it may have a disc-like part attached on its rotational shaft with slits on the circumference at equal intervals, through which light from a light source attached to a stationary part passes. The passing light, then, is detected by a photoelectric converter to be encoded into the encoder signal. With reshaping a waveform of the signal properly, a pulse signal may be obtained every time the motor moves a prescribed angle or distance.

The encoder 110 can be placed not only on the motor shaft, but also can be placed at other positions such as on a motion shaft or axis of an object driven by the motor 109. If placed on a linear motion axis, slits may be arranged linearly along the axis. Also, detection is not limited to optical detection using slits and a light source as discussed above, but magnetic detection or other forms of detection may be used instead.

In the following, an internal configuration of the microcomputer 101 will be described.

An interrupt generating section (IRQ) 102 generates a request for interrupt to the CPU 103 at every prescribed cycle.

The CPU 103 decodes program instructions stored in the memory (MEM) 104 in order and executes data movement, arithmetics, branches, interrupts, and the like.

The memory 104 stores programs and various kinds of data.

A counter (CNT1) 106 counts the encoder signal ENCP from the encoder 110 to output a count value ECNT.

A digital-analog converter (DAC) 107 converts a drive command signal CTL from the CPU 103, which is a digital quantity, into the drive command signal DRV, which is an analog quantity. As explained with the motor driver 108, the drive command signal DRV may be driven as a voltage or a PWM pulse.

The CPU 103, the memory 104, the counter 106, and the digital-analog converter 107 are connected with a data bus to exchange input/output data. The interrupt generating section 102, the CPU 103, the memory 104, the counter 106, and the digital-analog converter 107 configure the microcomputer 101.

Figure 2:
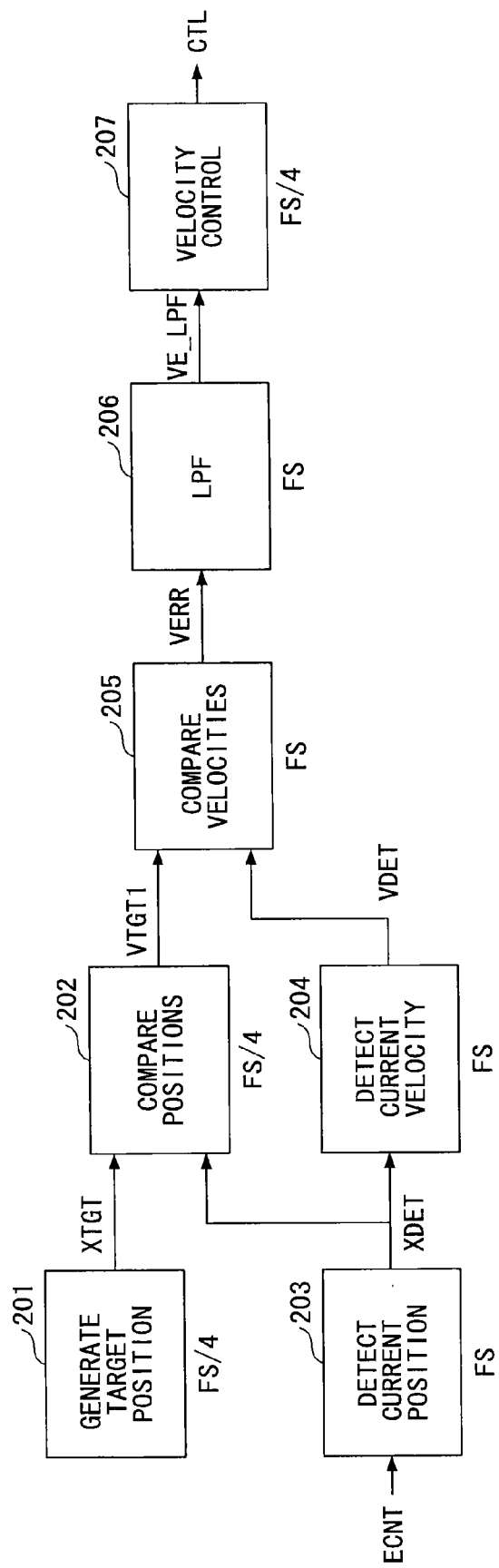
FIG. 2 is a signal flow diagram illustrating operations executed on a microcomputer according to the first embodiment.

FIG. 2 is a signal flow diagram illustrating operations executed on the microcomputer 101 according to the first embodiment.

This signal flow is activated and executed at regular intervals by the interrupt generating section 102. "FS" or "FS/4" placed under boxes with operation names denotes a sampling frequency. FS is the reciprocal of the basic interrupt cycle (1/FS). Operation boxes with FS placed underneath are executed every time an interrupt is activated by the interrupt generating section 102. Operation boxes with FS/4 placed underneath are executed every fourth time an interrupt is activated, whose sampling frequency is one-fourth of the basic interrupt frequency.

A generate-target-position operation 201 outputs a target position XTGT which is indicated by an external device (not shown), or the generate-target-position operation 201 computes a target position XTGT. The target position XTGT may take discrete stepping values with fixed intervals, or time-variant values obtained by integrating a prescribed profile of target velocity, which are design alternatives.

A detect-current-position operation 203 calculates a current position XDET of the motor 109 or an object to be moved by the motor, from the count value ECNT generated from the encoder signal ENCP. The count value ECNT may be simply just read, or it may be multiplied by a prescribed coefficient to convert it to a prescribed physical unit. It is preferable for the count value ECNT to be multiplied by a large coefficient to get the precision necessary for a later calculation by providing sufficient word length.

According to the present embodiment, an encoder pulse count is counted by the hardware counter 106. However, if the hardware counter 106 is not available, a boolean value (0 or 1) of the encoder pulse may be read as long as the interrupt process is executed with an interrupt cycle which is sufficiently shorter than the encoder pulse cycle. In this case, if a boolean value of the encoder pulse in an interrupt is changed from a boolean value in the preceding interrupt, it indicates that a pulse edge is detected, which can be detected by a software counter.

A compare-positions operation 202 compares the target position XTGT output from the generate-target-position operation 201 and the current position XDET output from the detect-current-position operation 203, and then multiplies the comparison result with a prescribed coefficient to output a target velocity VTGT1.

Specifically, the compare-positions operation 202 carries out the following calculation, written in a programming language with C or C++ style notation. "//" denotes comments.

VTGT1=(XTGT−XDET) * GX ; //GX is a prescribed coefficient.

This means that the greater the difference between the target position XTGT and the current position XDET, the faster the target velocity VTGT1 becomes in order to move the motor 109 faster to reduce the difference. Once the position difference becomes small, the target velocity VTGT1 decreases, which makes the motor 109 reach the target position XTGT smoothly.

A detect-current-velocity operation 204 calculates a current velocity VDET by taking the difference between the current position XDET and the previous position Z_XDET at every prescribed cycle. It is preferable to take the difference between the current position XDET and the previous position Z_XDET, and to multiply the difference by a prescribed coefficient to obtain the current velocity VDET.

Namely, the following calculation is executed at every interrupt cycle.

VDET=(XDET−Z_XDET) * GV ; // GV is a prescribed coefficient.
Z_XDET=XDET ;

VDET has a dimension of velocity because the above calculation is equivalent to differentiate the current position XDET to obtain the current velocity VDET.

Also, as explained with the detect-current-position operation 203, if the encoder pulse is counted by a software counter instead of by a hardware counter, a change of the boolean pulse value is detected first. For the sake of simplicity, the change of the pulse may be used as the current velocity VDET, which can be accumulated to obtain the current velocity VDET.

Namely, assuming that the encoder signal ENCP is read every interrupt cycle, the current velocity VDET and the current position XDET are calculated as in the following code, written in a programming language with C or C++ style notation, where "!=" is a conditional operator to determine inequality.

```
IF (ENCP != Z_ENCP) {         // if ENCP changes from the previous value,
    VDET = 1;                 // velocity VDET is set to 1
}
ELSE {           // otherwise
    VDET = 0;                 // velocity VDET is set to 0
}
XDET = XDET + VDET;           // accumulate VDET to obtain XDET
VDET = VDET * GV;             // multiply VDET by coefficient GV
Z_ENCP = ENCP;                // update the previous ENCP
```

This code obtains the current position XDET by counting both rising edges and falling edges of the pulse signal, and obtains the current velocity VDET by differentiating the current position XDET, namely, by taking a difference every interrupt cycle. If the hardware counter 106 is not available, the current position XDE and the current velocity VDET can be calculated as above. This is advantageous in terms of cost because the hardware counter 106 is not needed.

A compare-velocities operation 205 outputs an error difference of the velocity VERR, by comparing the target velocity VTGT1 with the current velocity VDET.

Namely, the following calculation is carried out.

VERR=VTGT1−VDET.

A low-pass filter (LPF) 206 executes a filtering calculation to pass low-range components of the velocity difference error VERR to output the filtered velocity difference error, VE_LPF.

The LPF 206 can be designed with publicly known signal processing theories.

Figure 3:
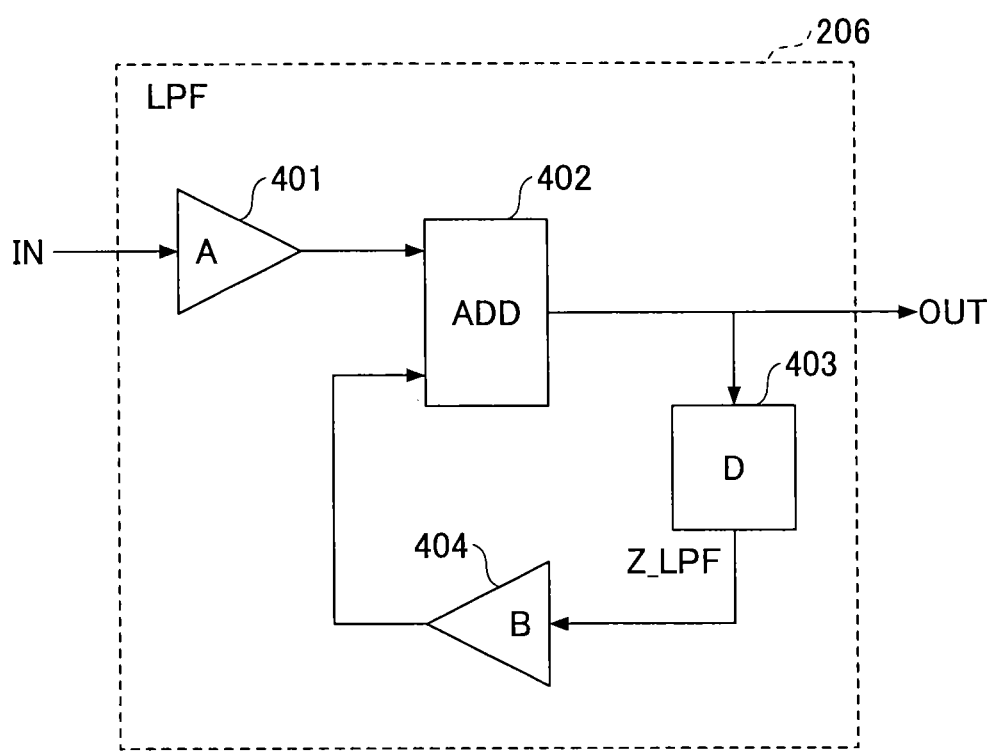
FIG. 3 is a signal flow diagram illustrating a first-order low-pass filter as an example of a low-pass filter operation.

FIG. 3 is a signal flow diagram illustrating a first-order low-pass filter as an example of the low-pass filter 206. The input signal IN corresponds to the velocity difference error VERR, and the output signal OUT corresponds to the velocity difference error VE_LPF.

The input signal IN is multiplied by a coefficient A at a coefficient multiplier 401, which is then received as one of the inputs to an adder 402. The adder 402 outputs the output signal OUT. The output signal OUT is preserved as a signal Z_LPF in a memory circuit 403 to hold the previous value of the calculation (interrupt) cycle, which is multiplied by a coefficient B at a coefficient multiplier 404, which is the other input of the adder 402. Given a cut-off frequency and the sampling frequency FS for the first-order low-pass filter, the coefficients A and B can be easily designed with publicly known signal processing theories.

The first-order low-pass filter in FIG. 3 can be executed with the following code. It is preferable to be executed every interrupt cycle (1/FS).

OUT=IN*A+Z_LPF*B

Z_LPF=OUT

At the first line of code, the output signal OUT is calculated from the input signal IN.

At the second line of code, the output signal OUT of the current cycle is stored as a memory variable Z_LPF for the calculation at the next cycle.

Referring to FIG. 2, a velocity-control operation 207 applies an error amplifying calculation to the velocity difference error VE_LPF, which has been filtered with the LPF 206, to output a drive command signal CTL.

It is preferable to use a well-known proportional integral derivative (PID) controller as an error difference amplifying calculation. A PID controller can be executed, for example, every four interrupt cycles (FS/4 or one fourth of the sampling frequency FS) as shown in the following code.

```
P = VERR * GP; //Multiply proportional gain GP.
I = I + VERR * GI; //Multiply integral gain GI and
accumulate.
    D = (VERR - Z_VERR) * GD; //Multiply derivative
gain GD to a difference from the previous velocity
difference error Z_VERR.
    CTL = P + I + D; //Add the proportional, integral,
and derivative gains to output CTL.
    Z_VERR = VERR; //update the value for the next
derivative calculation.
```

With a PID controller calculation, low range components of the velocity error difference are controlled to make the velocity error difference become zero by gaining a sufficiently large amplification factor with integration, and high range components of the velocity error difference can be stabilized with compensating current phase delay of a motor coil with differentiation. This velocity control operation is based on publicly known signal processing theories.

Figure 4:
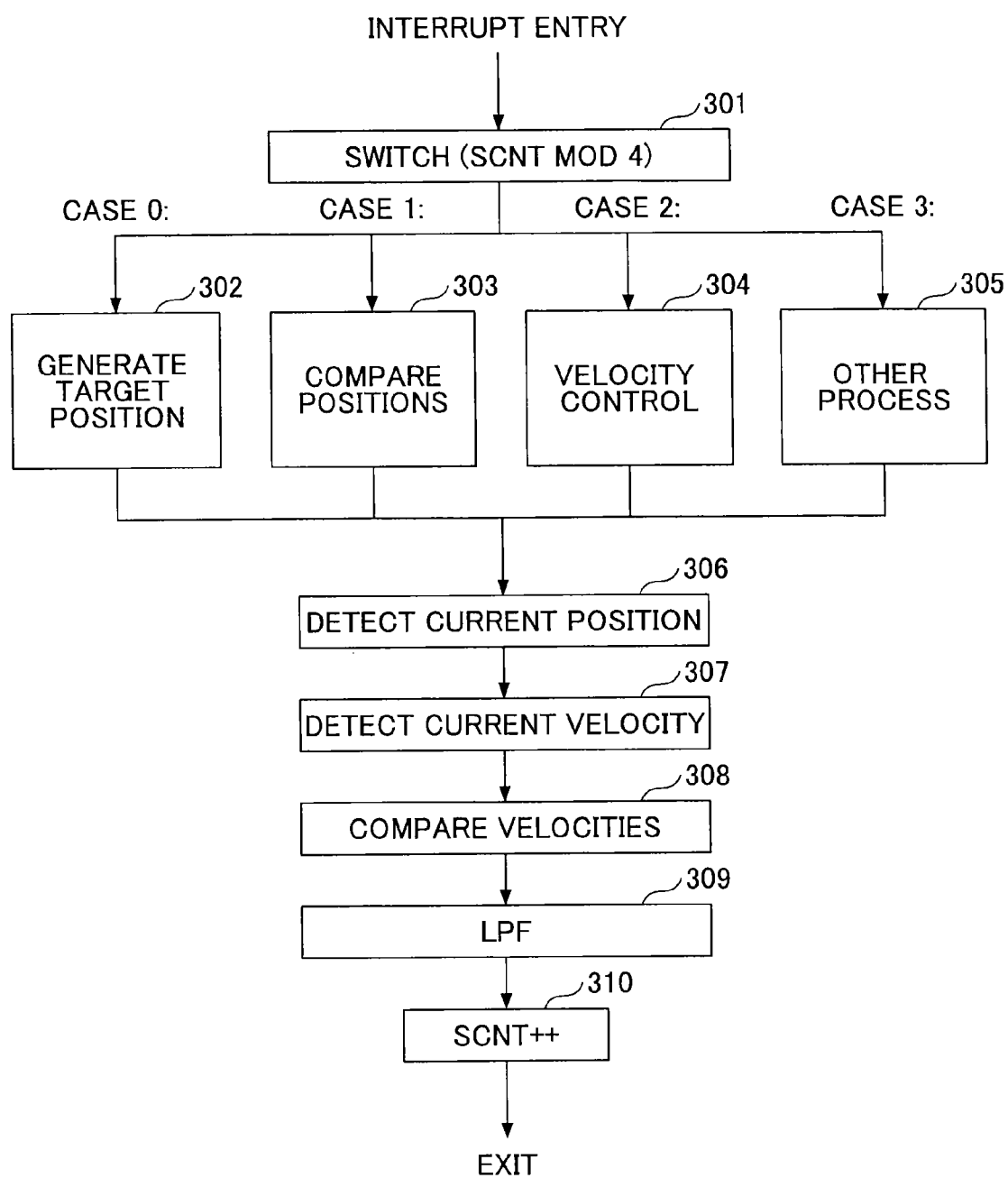
FIG. 4 is a flowchart illustrating an example of an execution of interrupt operations according to the first embodiment.

FIG. 4 is a flowchart illustrating an example of an execution of an interrupt process according to the first embodiment.

An interrupt is generated by the interrupt generating section (IRQ) 102 of the microcomputer 101 at a prescribed interval, which is executed with branching to an interrupt entry.

In FIG. 4, the same names are given to the steps that have the corresponding operations in FIG. 2.

At Step 301, one of the branches, i.e., cases 0-3 is taken according to a value obtained as a residue of dividing the interrupt count variable SCNT by four, or SCNT mod 4, ranging from 0 to 3. The interrupt count variable SCNT is incremented at Step 310 as the interrupt process is executed once.

With this branch mechanism, each of the four branches is selected and executed every fourth time an interrupt is activated. Steps 302-305 executed after being selected by the branch mechanism may be collectively called the "low-frequency processing section", and an individual operation included in the low-frequency processing section may be called a "low-frequency operation".

Steps 302-305 are executed in this order. Each of steps 302-305 is executed every fourth time an interrupt is activated. Therefore, with the interrupt cycle is 1/FS, the sampling frequency of these operations is FS/4.

Since Step 302, 303, and 304 correspond with the same name operations in FIG. 2, which are the operations 201, 202, and 207, respectively, an explanation for these steps are omitted. Step 305 is reserved in case that another operation is required.

Steps 306-309 are executed every time an interrupt is activated. These steps may be collectively called the "high-frequency processing section", and an individual operation included in the high-frequency processing section may be called a "high-frequency operation". An explanation of these steps is omitted since the same name operations in FIG. 2 were explained. The correspondences are as follows:

Step 306 corresponds to the operation 203. Step 307 corresponds to the operation 204. Step 308 corresponds to the operation 205. Step 309 corresponds to the operation 206.

Step 310 increments the interrupt count variable SCNT.

According to the first embodiment, as described above, the low-frequency operations are selectively executed at an interrupt, and the high-frequency operations are always executed at every interrupt.

The high-frequency operations include the detect-current-position operation 203 or Step 306, the detect-current-velocity operation 204 or Step 307, the compare-velocities operation 205 or Step 308, and the low-pass filter 206 or Step 309. In general, detection of the current position and current velocity require high performance in a velocity control loop. These detection operations are executed at every interrupt to enable a fast, precise control.

The low-frequency operations include the generate-target-position operation 201 or Step 302, the compare-positions operation 202 or Step 303, and the velocity control operation 207 or Step 304. It is noted that the compare-positions operation 202 or Step 303 may also be executed as a high-frequency operations.

These low-frequency operations do not affect performance when executed with a relatively low frequency. Therefore, by executing these operations in that order at every fourth time an interrupt is activated, it is possible to use a low-cost microcomputer with a low-performance CPU.

If all operations are executed every time with a low-performance CPU, there may be a possibility that some operations may not end within an interrupt cycle, which collapses the over all control. Such a collapse can be avoided by distributing operations which can be executed with a low frequency, without decreasing the over all performance of the control.

<Second Embodiment>

Figure 5:
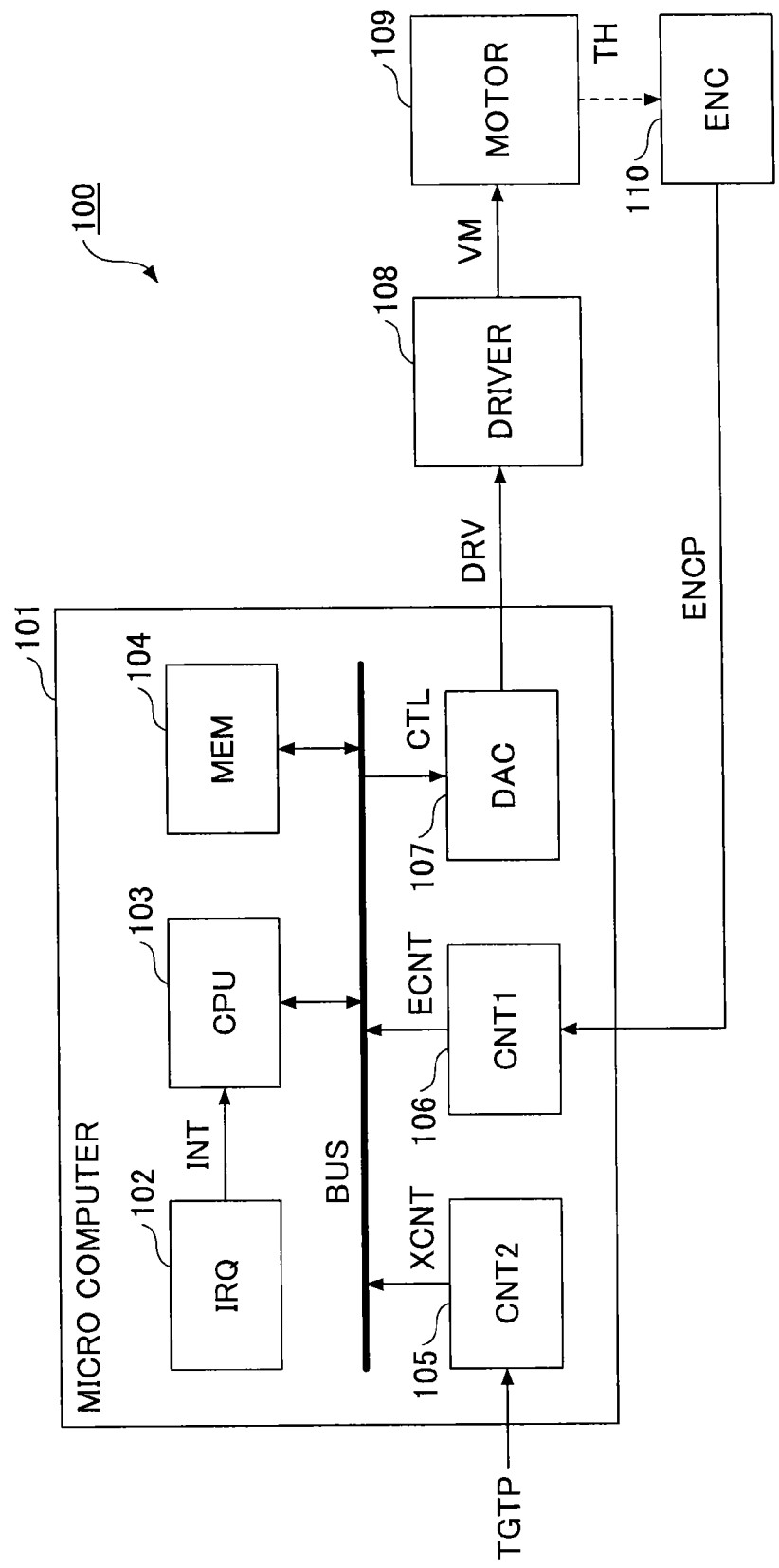
FIG. 5 is a schematic view illustrating a hardware configuration example of a motor controller according to the second embodiment.

FIG. 5 is a schematic view illustrating a hardware configuration example of a motor controller according to the second embodiment.

FIG. 5 differs from FIG. 1 in that a counter 105 is newly added for counting a target pulse signal TGTP from an external device to output a count value XCNT. Namely, a mechanism is added to receive as input a target pulse signal from an external device. An explanation is omitted for the elements that have the same reference numerals as in FIG. 1 because these elements have the same functions.

Figure 6:
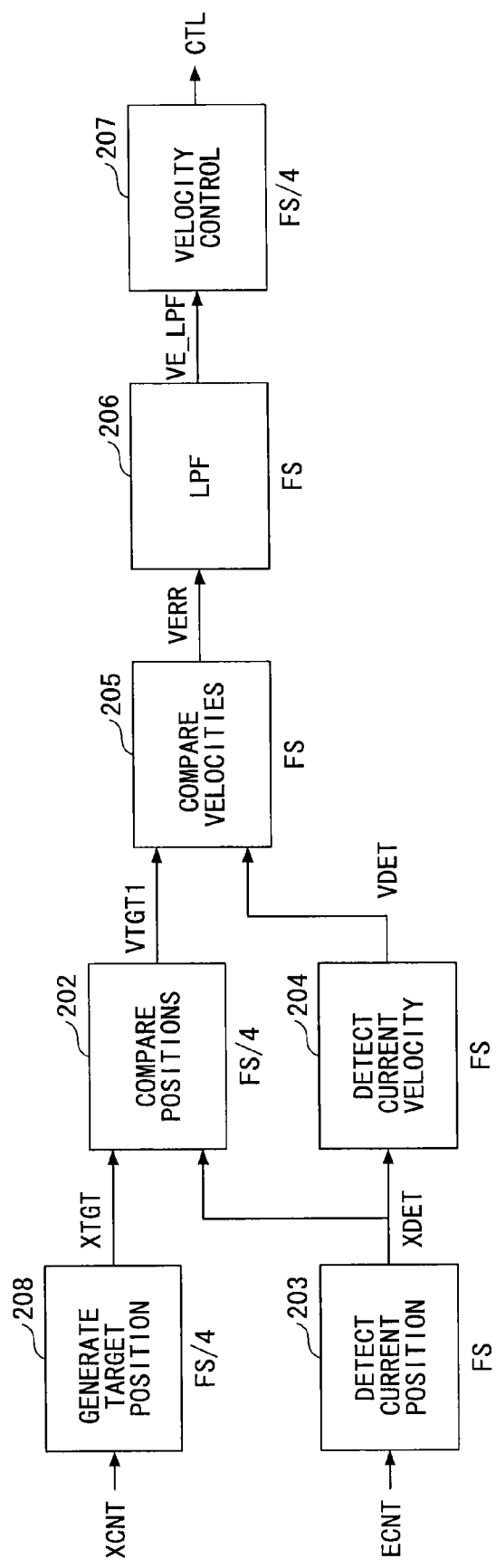
FIG. 6 is a signal flow diagram illustrating operations executed on a microcomputer according to the second embodiment.

FIG. 6 is a signal flow diagram illustrating operations executed on the microcomputer 101 according to the second embodiment.

A generate-target-position operation 208 generates a target position XTGT by reading a count value XCNT that counts a target pulse signal TGTP from the external device. The sampling frequency of this operation is FS/4. Namely this operation is executed at every fourth time an interrupt is activated.

A explanation of other operations that have the same reference numerals as in FIG. 2 is omitted. The difference with FIG. 6 is that, instead of the generate-target-position operation 201 as illustrated in FIG. 2, the generate-target-position operation 208 is provided.

With this process, if a target pulse is provided from the external device to generate a target position, it is possible to control a motor to follow the target position.

Figure 7:
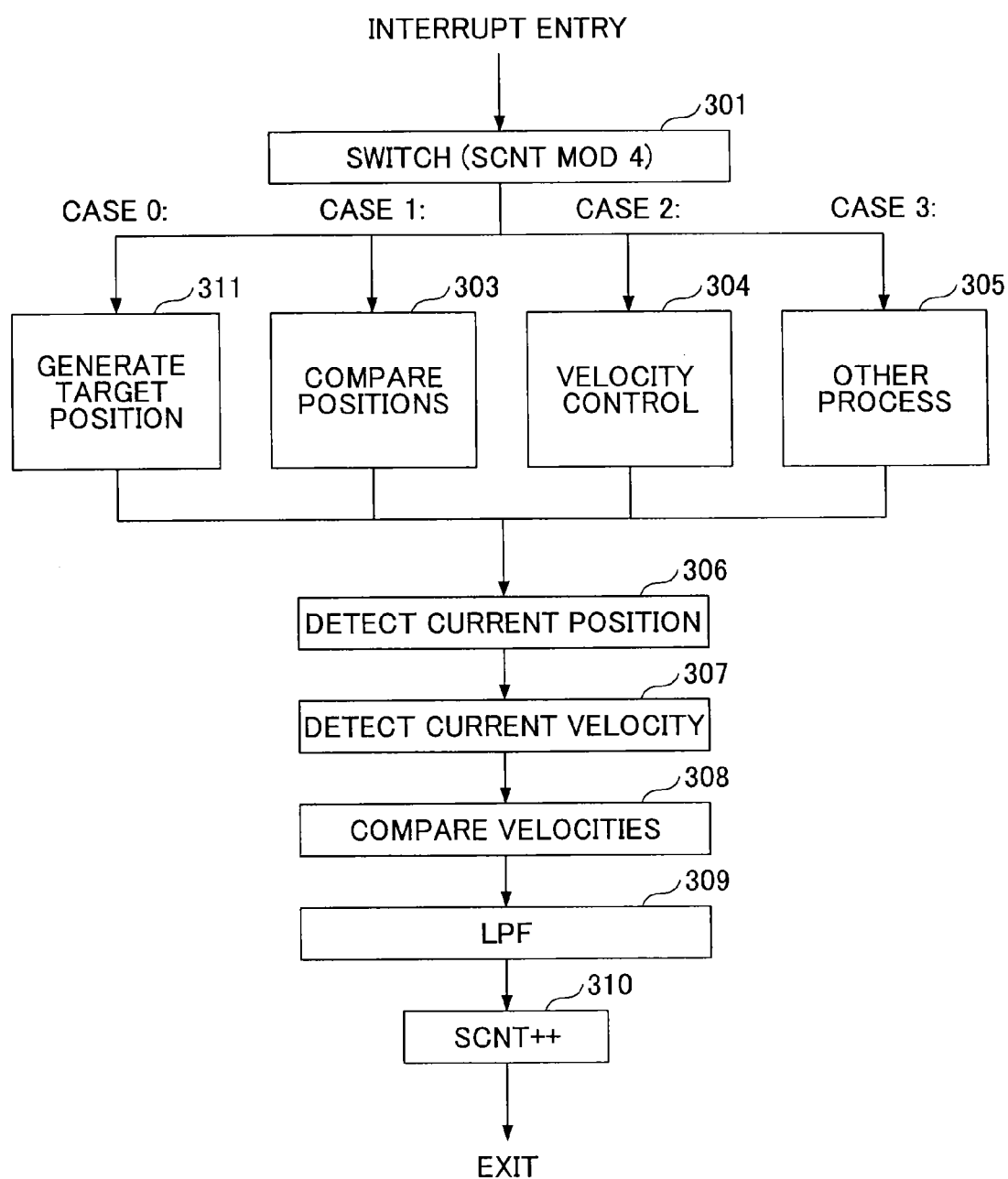
FIG. 7 is a flowchart illustrating an example of an execution of interrupt operations according to the second embodiment.

FIG. 7 is a flowchart illustrating an example of an execution of an interrupt process according to the second embodiment.

In FIG. 7, Step 311 corresponds to the generate-target-position operation 208 in FIG. 6. Other steps are the same as the steps with the same reference numerals in FIG. 4.

<Third Embodiment>

Figure 8:
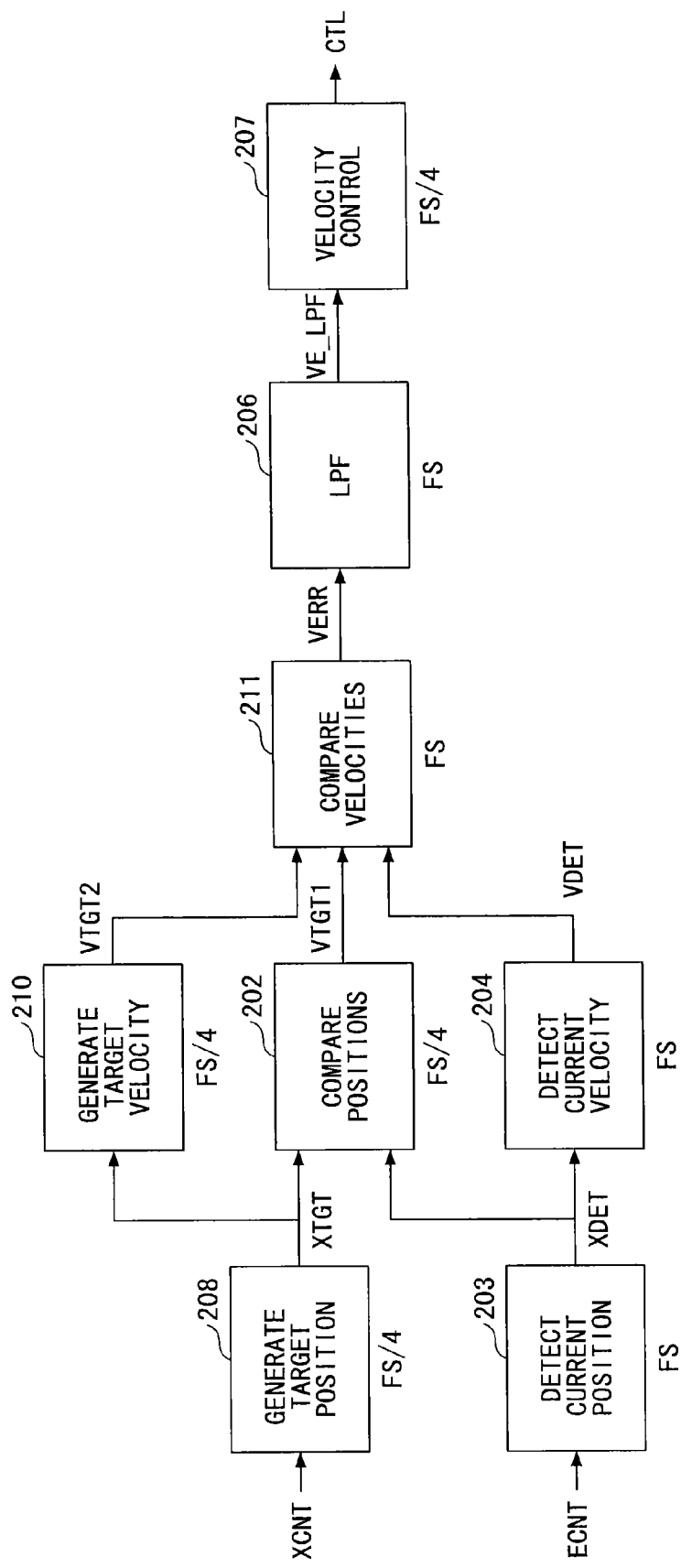
FIG. 8 is a signal flow diagram illustrating operations executed on a microcomputer according to the third embodiment.

FIG. 8 is a signal flow diagram illustrating operations executed on the microcomputer 101 according to the third embodiment. The hardware configuration in the third embodiment is the same as in the second embodiment shown in FIG. 5.

In FIG. 8, a generate-target-velocity operation 210 differentiates a target position XTGT output by the generate-target-position operation 208 to output a second target velocity VTGT2. Specifically, the generate-target-velocity operation 210 outputs the second target velocity VTGT2 by taking the difference between the target position XTGT at the current interrupt and the target position Z_XTGT at the previous interrupt.

It is preferable that the second target velocity VTGT2 has the same unit as the current velocity VDET output by the detect-current-velocity operation 204. The current velocity VDET is generated at every interrupt with the sampling frequency FS, while the generate-target-velocity operation 210 operates at every fourth interrupt with the sampling frequency FS/4. Therefore, it is preferable to divide the coefficient GV by four when generating the second target velocity VTGT2 to obtain in the same unit.

For example the generate-target-velocity operation 210 can be executed with the follow calculation.

VTGT2 = (XTGT − Z_XTGT) * GV/4; // Difference of target positions (multiplied by 1/4).
    Z_XTGT = XTGT    //update the previous target position.

A compare-velocities operation 211 differs from the compare-velocities operation 205 in FIG. 6 in that the second target velocity VTGT2 output by the generate-target-velocity operation 210 is used for the calculation.

The compare-velocities operation 211 calculates a target velocity by adding the first target velocity VTGT1 output by the compare-positions operation 202 and the second target velocity VTGT2 output by the generate-target-velocity operation 210, and then compares the calculated target velocity with the current velocity to output the velocity difference error VERR.

Namely, the velocity difference error VERR is computed as follows.

$$VERR = VTGT1 + VTGT2 - VDET;$$

By adding the second target velocity VTGT2 generated from target position XTGT to the VERR equation, the second target velocity VTGT2 and the current velocity VDET are balanced while a motor is moving at a uniform velocity, which maintains the first target velocity VTGT1 at around zero as long as there is no disturbance. Therefore, a difference (XTGT-XDET), which is calculated when generating the first target velocity VTGT1, is also maintained at around zero, which makes it possible to control the motor to follow the target position almost completely, and thus a very precise position control can be executed. Other operations are the same as shown in FIG. 6 with the same reference numerals.

Figure 9:
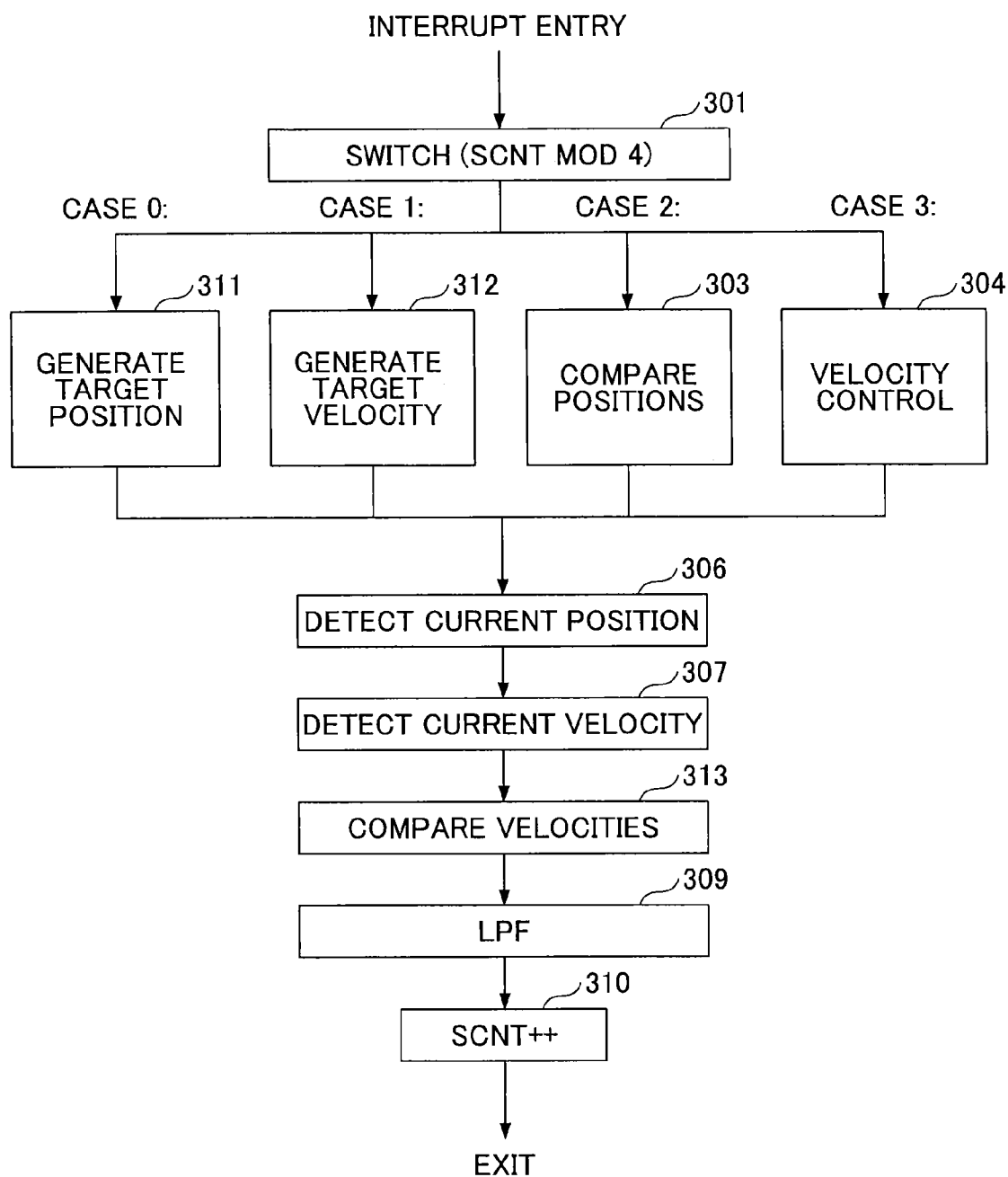
FIG. 9 is a flowchart illustrating an example of an execution of interrupt operations according to the third embodiment.

FIG. 9 is a flowchart illustrating an example of an execution of an interrupt process according to the third embodiment.

Step 312 corresponds to the generate-target-velocity operation 210 in FIG. 8, which is inserted to a branch with the residue 1 of the interrupt count variable SCNT divided by four (i.e., case 1). Therefore, Step 303 and Step 304 are moved to branches with the residue 2 (i.e., case 2) and the residue 3 (i.e., case 3), respectively, which leaves no branch for an additional operation. It is noted that Step 312 may be included in the high-frequency processing section as explained with Step 303.

Step 313 corresponds to the compare-velocities operation 211 in FIG. 8. Other operations are the same as shown in FIG. 7 with the same reference numerals.

FIG. 10 is a schematic view illustrating an execution schedule of the interrupt process according to the third embodiment.

Numbers aligned horizontally show interrupt timings as the interrupt count variable SCNT increases from 0 to 11, and the leftmost column shows operations to be executed. If an operation is executed at a specific interrupt timing, it is shown with asterisk "*" at the cross point of the operation and the interrupt timing. It can be seen that the execution order of "*"s in FIG. 10 is the same as the execution order of the operations executed at interrupts as shown in FIG. 9. Similarly, an execution schedule in other embodiments can be shown with a similar schedule table.

<Fourth Embodiment>

Figure 11:
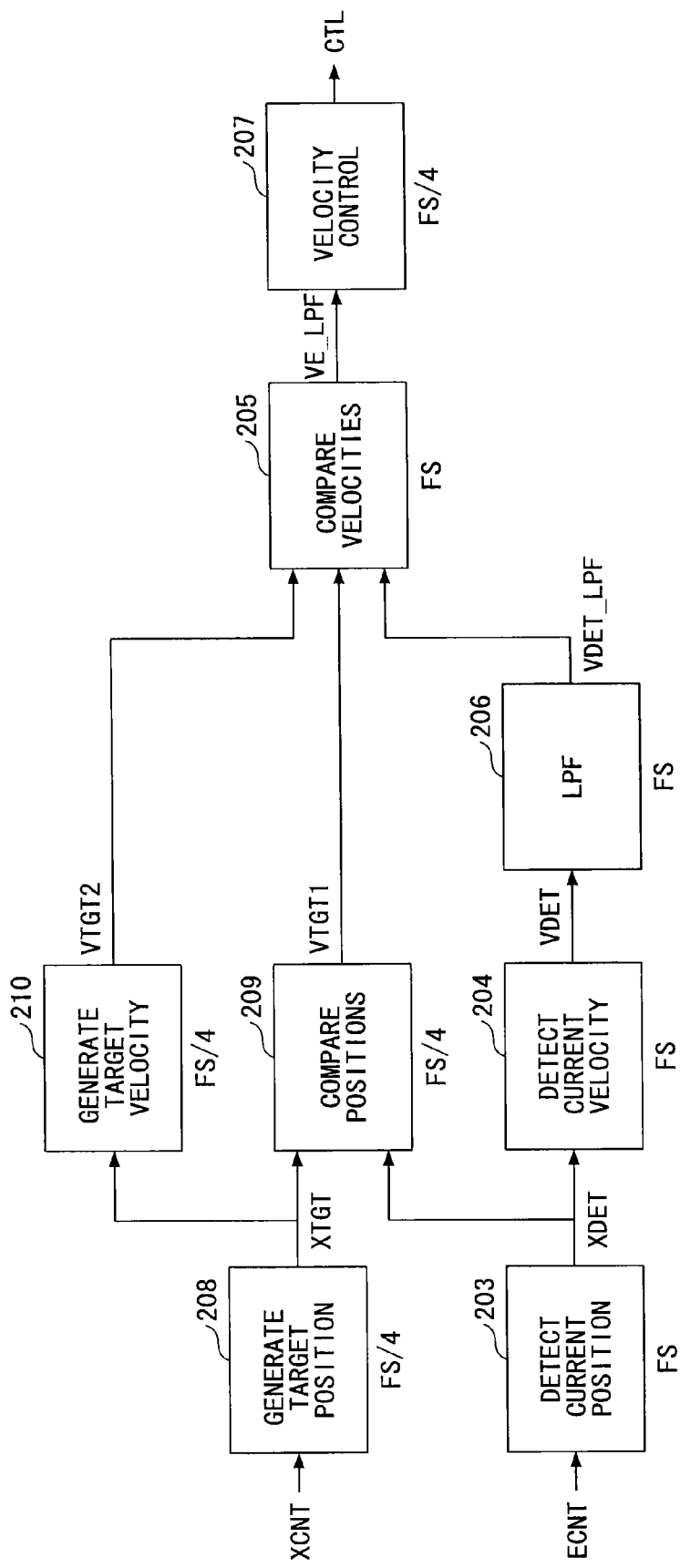
FIG. 11 is a signal flow diagram illustrating operations executed on a microcomputer according to the fourth embodiment.

FIG. 11 is a signal flow diagram illustrating operations executed on the microcomputer 101 according to the fourth embodiment.

The hardware configuration in the fourth embodiment is the same as in the second embodiment shown in FIG. 5.

Operations in FIG. 11 are the same as the operations shown in FIG. 8 having the same reference numerals, but differ in that the LPF 206 is inserted before the compare-velocities operation 205. The LPF 206 extracts low range components from the current velocity VDET output by the detect-current-velocity operation 204 to output VDET_LPF to the compare-velocities operation 205.

Taking this into consideration, the compare-velocities operation 205 uses the VDET_LPF instead of the VDET.

Namely, the velocity difference error VERR is calculated as follows:

$$VERR = VTGT1 + VTGT2 - VDET\_LPF;$$

Figure 12:
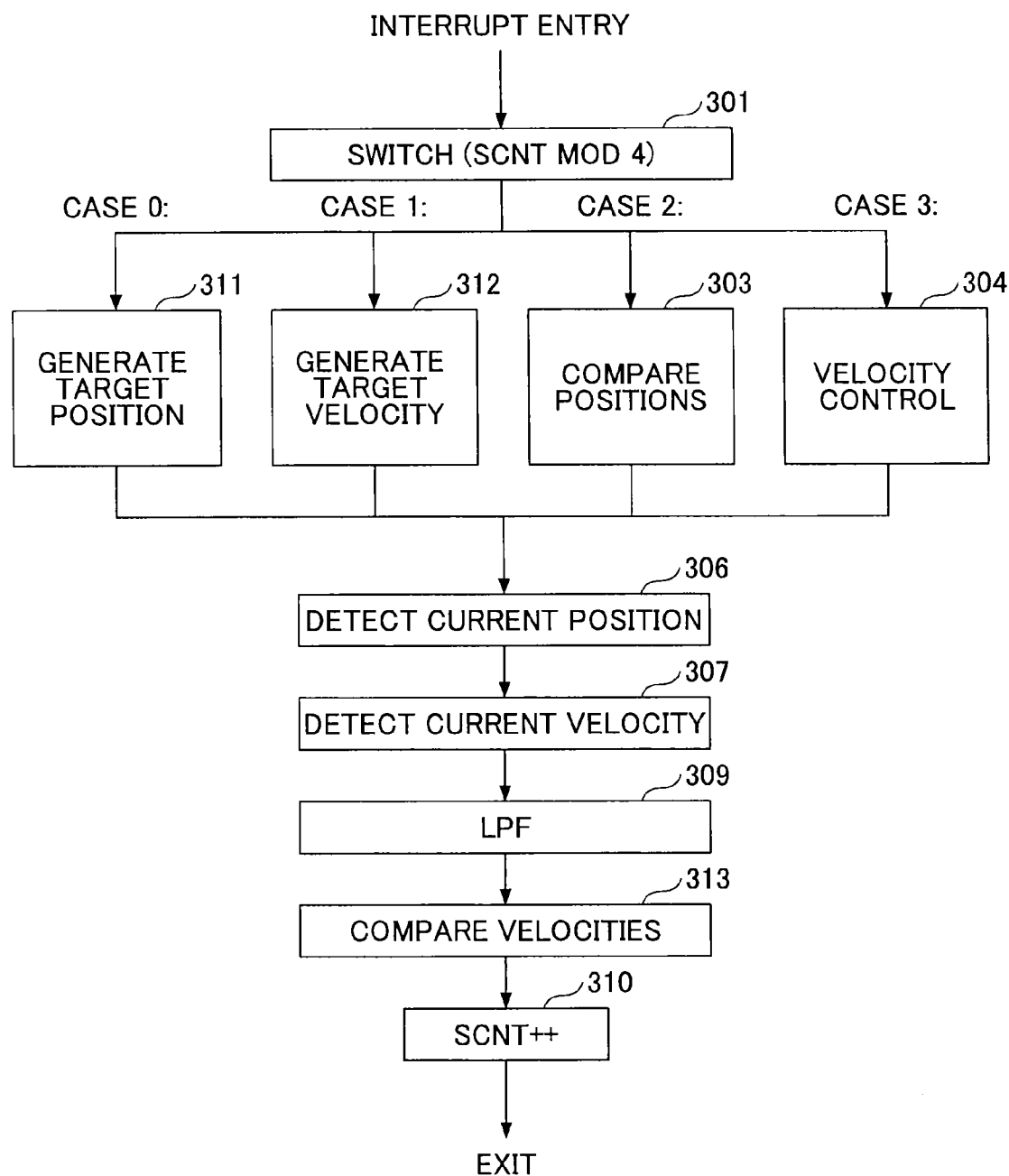
FIG. 12 is a flowchart illustrating an example of an execution of interrupt operations according to the fourth embodiment.

FIG. 12 is a flowchart illustrating an example of an execution of interrupt operations according to the fourth embodiment.

With the LPF 206 relocated discussed above, the order of the operations is changed in the flowchart. Step 309 comes before Step 313. Step 313 corresponds to the compare-velocities operation 205 in FIG. 11. Other operations are the same as shown in FIG. 9 with the same reference numerals.

By applying the LPF at Step 309 only to the current velocity VDET before the compare-velocities operation or Step 313, it is possible to obtain a smooth current velocity VDET_LPF before comparing velocities. The current velocity VDET before smoothing is obtained only as pulses taking values either of GV or 0 with the difference calculation. It is inconvenient to use the current velocity VDET before smoothing for other purposes, for example, to change control parameters such as gains in response to the current velocity. The current velocity VDET_LPF obtained after smoothing can be used for other purposes easily to control the motor in various ways.

<Fifth Embodiment>

Figure 13:
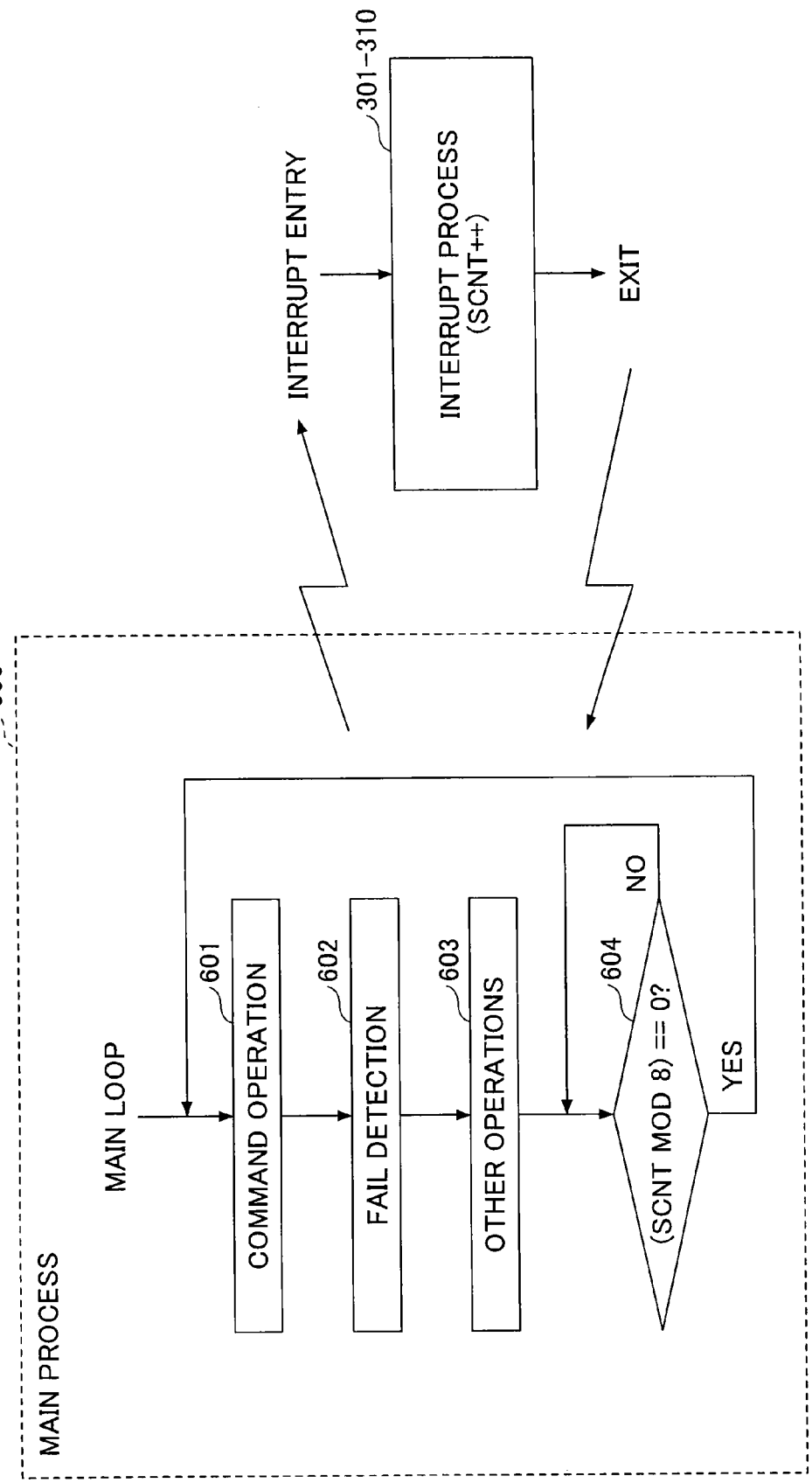
FIG. 13 is a flowchart illustrating a main process and an interrupt process executed on a microcomputer according to the fifth embodiment.

FIG. 13 is a flowchart illustrating a main process and an interrupt process executed on a microcomputer according to the fifth embodiment. The hardware configuration in the fifth embodiment is the same as in the second embodiment shown in FIG. 5.

In FIG. 13, a main process 600 executes Steps 601-604 sequentially when an interrupt is not being processed.

A command operation 601 uses an appropriate communication interface (not shown) to receive a start/stop command, a target position command, etc., from an external device to start/stop a part of or an entire interrupt process.

A fail-detection operation 602 regularly monitors various variables, which are updated in response to the motor control operations. The variables include, for example, a difference between the target velocity and the current velocity, a difference between the target position and the current position, or control output values. If one of these values exceeds a prescribed value or a prescribed range, an abnormal state is determined. In that case, the motor control is stopped, or a failure report is sent to the external device.

Other operations 603 are reserved for additional operations if any, which usually executes nothing.

A determining operation 604 monitors the number of interrupts or the value of the SCNT variable incremented with an interrupt to wait for that the value is increased by eight. When the value is increased by eight, the processing goes back to the start of the main process 600, thus configures a main loop.

The interrupt process 301-310 is executed every prescribed interrupt cycle with priority over other processes. Specifically, it is the same as the process described with FIG. 4, FIG. 7, FIG. 9, and FIG. 12.

Configured in this way, the main loop is completed a round with eight interrupts, the operations in the main process 600 are executed once every eight interrupts. Therefore, it is possible to manage time correctly in the main process 600. The fail-detection operation 602, especially, needs to measure time correctly for determining, for example, whether a failed state continues for a prescribed period of time. This can be implemented at low cost without hardware such as a timer because it is possible to manage time correctly based on interrupt cycles.

Also, it is possible to provide a low-cost, multi-functional control because a long operation can be executed in the main loop, which is different from the interrupt process that should be completed within a given interrupt cycle.

As explained above, the embodiments have the following advantages.

(1) Operations to be executed during an interrupt are divided into low-frequency operations and high-frequency operations, or collectively into the low-frequency processing section and the high-frequency processing section. The high-frequency processing section includes at least an operation detecting motor position. The low-frequency processing section includes at least an operation computing a motor drive command in response to the motor position. Therefore, it is possible to detect the position securely, and to control the motor with high precision even when the motor is rotating fast. Namely, even using an inexpensive microcomputer, control is more stable than in conventional control where all of the interrupt operations are executed every time. In conventional control, some operations may not be completed within an interrupt cycle, which collapses the over all control, or delayed operations may cause unstable or incorrect control. Therefore, it is possible to control the position and the velocity of a motor stably at a low cost, and with high precision. Including a position detection operation in the high-frequency processing section especially contributes to detecting a position securely when a motor is rotating fast.

Also, including a PID operation or the like, which can be executed relatively slowly, in the low-frequency processing section contributes to reduced workload of a CPU.

(2) Including a velocity detection operation in the high-frequency processing section makes it possible to detect the velocity even when the motor is rotating fast, which leads to highly precise control. Moreover, operations allowing relatively low-frequency execution, such as target position generation or position comparison, are not executed every time, which reduces the workload of a CPU even further. Thus, it is possible to control the position and the velocity of a motor stably at a low cost, and with high precision.

(3) Counting pulses coming from an external device to compute a target position makes it possible to follow pulses from the external device for controlling motor position with high precision, and to detect a target position and a current velocity securely to control a motor with high precision even when the motor is rotating fast.

(4) In addition to the first target velocity which is usually used, the second target velocity from a change in the target position is computed. By using the added value of the first and second target velocities, it is possible to reduce deviation of positions to follow during control, which leads to highly precise control.

(5) Low-pass filtering is applied to extract low range components of the velocity error difference, which reduces noises when detecting the velocity, which leads to highly precise control even further.

(6) A main process is executed while an interrupt is not being executed, to determine a failed state in response to a driving command or a motor position calculated during the interrupt. This enables more operations to be executed under proper time management at low cost without additional hardware such as a timer. Especially, sufficient time can be allocated to detect abnormal behavior, which leads to highly reliable control.

As above, the embodiments of the present invention have been described. Further, the present invention is not limited to these embodiments, but various variations and modifications may be made without departing from the scope of the present invention.

The present application is based on Japanese Priority Application No. 2012-055153 filed on Mar. 12, 2012, and Japanese Priority Application No. 2012-275888 filed on Dec. 18, 2012, with the Japanese Patent Office, the entire contents of which are hereby incorporated by reference.

What is claimed is:

1. A motor controller, accepting an encoder signal changing in response to a driving position of a motor, and outputting a driving signal of the motor in response to the encoder signal, comprising:
   processing circuitry configured to
      execute a first process to detect the driving position of the motor from a value counting change of a state of the encoder signal;
      execute a second process to output the driving signal of the motor in response to the driving position of the motor detected by the processing circuitry; and
      execute a third process to generate a target position of the motor,
   wherein the first process detects the driving position of the motor at intervals shorter than execution intervals of the second process, and
   wherein the second process and the third process are executed at the same interval and having a different phase.

2. The motor controller, as claimed in claim 1, wherein
the second process outputs the driving signal of the motor, based on the target position and the driving position, and
the first process detects the driving position of the motor at intervals shorter than execution intervals of the third process.

3. The motor controller, as claimed in claim 2, wherein the third process obtains a value by integrating a predetermined target velocity profile, to generate the value as the target position of the motor.

4. The motor controller, as claimed in claim 1, further comprising:
a counter configured to count a target pulse signal from an outside source,
wherein the motor controller generates the target position of the motor, based on a count amount counted by the counter.

5. The motor controller, as claimed in claim 1, wherein the processing circuitry is further configured to execute a fourth process to compare the driving position detected in the first process with the target position generated in the third process, wherein the fourth process is executed at the same interval as the second and third processes, and having a different phase than the second process and the third process.

6. A method of controlling a motor, accepting an encoder signal changing in response to a driving position of a motor, and outputting a driving signal of the motor in response to the encoder signal, the method comprising:
executing a first process to detect the driving position of the motor from a value counting change of a state of the encoder signal;
executing a second process to output the driving signal of the motor in response to the driving position of the motor detected by the first process;
executing a third process to generate a target position of the motor,
wherein the first process detects the driving position of the motor at intervals shorter than execution intervals of the second process, and
wherein the second process and the third process are executed at the same interval and having a different phase.

7. The method, as claimed in claim 6, wherein the method further includes executing a fourth process to compare the driving position detected in the first process with the target position generated in the third process, wherein the fourth process is executed at the same interval as the second and third processes, and having a different phase than the second process and the third process.

8. A non-transitory computer-readable recording medium having a program stored therein for causing a computer to execute a method of controlling a motor, accepting an encoder signal changing in response to a driving position of a motor, and outputting a driving signal of the motor in response to the encoder signal, the method comprising:
executing a first process to detect the driving position of the motor from a value counting change of a state of the encoder signal;
executing a second process to output the driving signal of the motor in response to the driving position of the motor detected by the first process;
executing a third process to generate a target position of the motor,
wherein the first process detects the driving position of the motor at intervals shorter than execution intervals of the second process, and
wherein the second process and the third process are executed at the same interval and having a different phase.

9. The non-transitory computer-readable recording medium, as claimed in claim 8, wherein the method further includes executing a fourth process to compare the driving position detected in the first process with the target position generated in the third process, wherein the fourth process is executed at the same interval as the second and third processes, and having a different phase than the second process and the third process.

* * * * *